April 1, 1930.   C. W. LARNER   1,752,439
SLEEVE VALVE
Filed Oct. 14, 1926

Inventor
Chester W. Larner
By his Attorneys
Edwards Sager & Bower

Patented Apr. 1, 1930

1,752,439

UNITED STATES PATENT OFFICE

CHESTER W. LARNER, OF PHILADELPHIA, PENNSYLVANIA, ASSIGNOR TO I. P. MORRIS AND DE LA VERGNE, INC., A CORPORATION OF DELAWARE

SLEEVE VALVE.

Application filed October 14, 1926. Serial No. 141,452.

This invention relates generally to hydraulic valve mechanisms and more particularly to valve mechanisms of the sleeve type.

An object of my invention is to provide an improved sleeve valve which will be simple in construction and operation and will permit the use of a minimum size sleeve while at the same time having a smooth fluid passageway through the valve mechanism formed by relatively fixed elements.

Figure 1:
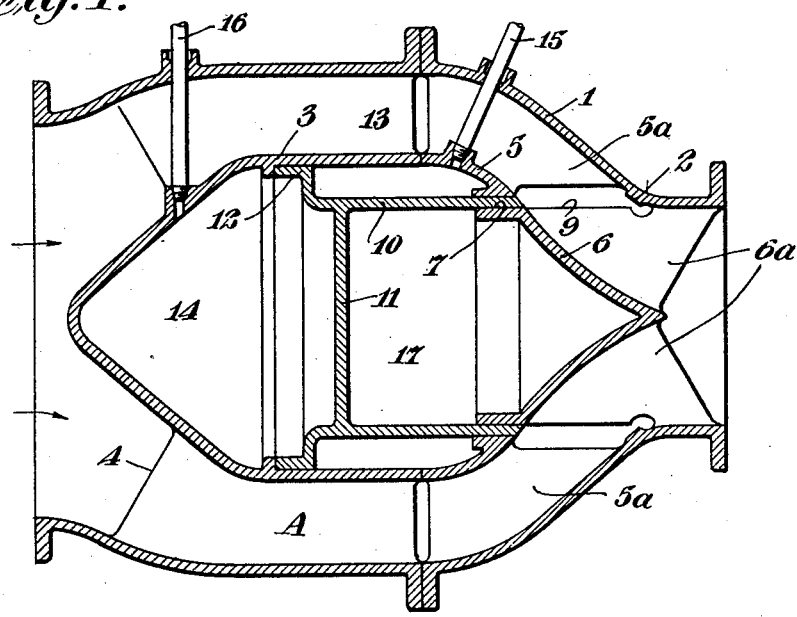
Figure 2:
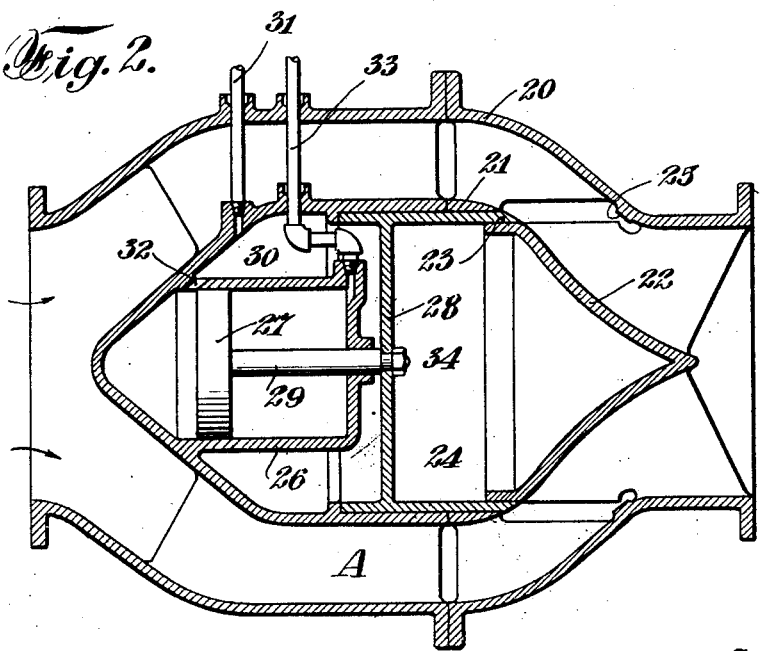

Other objects and advantages will be apparent from the following description of the accompanying drawings, in which Fig. 1 is a sectional view of the valve, and
Fig. 2 is a sectional view of a modified form of the valve.

In the illustrative embodiment of my invention there is shown an outer casing 1, provided at its outlet end with a seat 2. The size of the inlet and outlet may be varied in accordance with various conditions. The inlet and outlet may be of the same diameter as shown in Fig. 2, or they may be of different diameter as shown in Fig. 1. An inner hollow casing 3 is supported centrally within the casing 1 as by ribs 4, thereby forming an annular fluid passageway A. A forward portion of the complete interior structure is formed by a curved circular member 5 and immovable nose piece 6, these being slightly separated to form an annular clearance space 7. The members 5 and 6 are held in fixed relation to a sectional part of the casing 1 as by ribs 5ª and 6ª respectively. The edges 9 of ribs 6ª form suitable guide ways for a movable sleeve 10 which is of annular construction and is slidable through annular space 7, and across the fluid passageway into engagement with seat 2. The inner end of sleeve 10 has a closed partition 11 and an annular flange 12 forming a piston. The sleeve 10 and internal casing form an annular fluid chamber 13 and an internal plunger chamber 14. Fluid is supplied to or from the chambers 13 and 14 by pipes 15 and 16, while any necessary fluid flow relative to the chamber 17 may be had by leakage through the fit between the valve sleeve and nose piece 6.

In operation to close the valve fluid will be supplied from any suitable source, such as from the upstream pipe line through pipe 16 to chamber 14 and due to the differential areas of piston 12 the sleeve 10 will be moved forwardly to engage seat 2, fluid in chamber 13 being exhausted through pipe 15 to either atmosphere or to a low pressure region in the downstream pipe. To open the valve fluid is discharged from chamber 14 through pipe 16 and fluid admitted from any suitable source, such as the main conduit, through pipe 15 to chamber 13. Pipes 15 and 16 could each be connected to the same source of pressure supply or to the same point of exhaust as by any suitable type of valve usually employed for such purposes.

It is to be noted that the passageway formed between the interior and exterior casings has fixed walls and that the only movable portion of the valve exposed to the flowing water is the very outer edge of the annular sleeve 10. The advantage is that the movable portion of the valve mechanism is subjected to very small hydraulic forces when they are at their maximum, such for instance as when the valve is completely open, this being in distinction to those types of valves wherein the whole nose piece is movable or there is a large portion of the movable part of the valve exposed to the flowing fluid. Consequently, the valve will not be subjected to that degree of vibration or other characteristics which would have a tendency to wear the valve or make it difficult to operate.

A still further advantage resides in the fact that the movable part of the valve is subjected to minimum hydraulic reaction forces caused by the flowing fluid, and consequently permitting a small degree of operating pressure to be used. These advantages are combined with the further advantage that a minimum sized sleeve may be used, which is due to the fact that said sleeve is disposed within the interior casing.

In some instances, if the design of the valve is such that the drop of pressure in the passageway adjacent clearance space 7 is sufficiently great, the pipe 15 could be dispensed with and water from chamber 13 expelled through the fit at the clearance space. In fact, if it should be necessary, the clearance space could be enlarged.

The above and other advantages are also present in the modified form of my valve shown in Fig. 2, wherein there is formed the annular fluid passageway A by exterior and interior casings 20 and 21, the latter having associated therewith a fixed nose piece 22. An annular space 23 is provided between the nose piece and the remaining interior structure. A sleeve 24 is movable through said space and across passageway A into engagement with a seat 25. Instead of having an operating piston formed directly on the sleeve there is provided a cylinder 26 fixed to the casing 21 and having a piston 27 connected to a sleeve partition 28 as by a connecting rod 29. There is formed an interior plunger chamber 30 to which fluid is supplied or exhausted by a pipe 31, said fluid having constant communication with the left end of cylinder 26 as by a port 32. Fluid for the front end of said cylinder is conducted through a pipe 33. Any necessary fluid flow relative to the chamber 34 will be taken care of by suitable clearance in the annular groove 23.

In operation to close the valve fluid will be exhausted from the right end of cylinder 26 and supplied to chamber 30 and the left end of cylinder 26, while to open the valve the reverse operation will be employed.

I claim:

1. A valve mechanism comprising inner and outer casings spaced to form a relatively smooth fluid passageway therebetween, said outer casing having a seat formed thereon, a sleeve disposed within the interior casing and having a closed partition and an open downstream end and means for effecting movement of said sleeve including the operating element movable therewith.

2. A valve mechanism comprising inner and outer casings spaced to form a relatively smooth fluid passageway therebetween, said outer casing having a reduced portion upon which a seat is formed, while said inner casing has a fixed nose piece spaced from the remainder of the interior casing to form an opening, a sleeve movable through said opening into engagement with said seat to control fluid flow through said valve, and a piston element for operating said sleeve, the area of said piston supplementing the cross sectional area enclosed by said sleeve.

3. A valve mechanism comprising inner and outer casings spaced to form a smooth fluid passageway therebetween, said outer casing having a reduced portion upon which a seat is formed, said interior casing having a fixed nose piece, a sleeve disposed within said interior casing and movable through an opening therein into engagement with said seat, and piston and cylinder elements spaced from said sleeve but operatively connected thereto for moving the same to its open and closed position.

4. A valve mechanism comprising inner and outer casings spaced to form a smooth fluid passageway therebetween, said outer casing having a reduced portion upon which a seat is formed, said interior casing having a fixed nose piece, a sleeve disposed within said interior casing and movable through an opening therein into engagement with said seat, and means for operating said sleeve including an interior fluid chamber and piston and cylinder elements spaced from but operatively associated with said sleeve.

5. A valve mechanism comprising inner and outer casings spaced to form a smooth fluid passageway therebetween, said outer casing having a reduced portion upon which a seat is formed, said interior casing having a fixed nose piece, a sleeve disposed within said interior casing and movable through an opening therein into engagement with said seat, and means for operating said sleeve including an interior fluid chamber and piston and cylinder elements operatively associated with said sleeve and so arranged with respect thereto that the area of said piston supplements the cross sectional area enclosed by said sleeve, one end of said piston being subjected to the same fluid pressure as that to which said chamber is subjected.

6. A valve mechanism comprising inner and outer casings spaced to form a smooth fluid passageway therebetween, said outer casing having a reduced portion upon which a seat is formed, a sleeve disposed within said interior casing and movable through an opening therein into engagement with said seat, and means for operating said sleeve including a closed partition extending across the same to form an interior chamber within said inner casing, and means for supplying fluid to said chamber.

7. A valve mechanism comprising inner and outer casings spaced to form a smooth fluid passageway therebetween, said outer casing having a reduced portion upon which a seat is formed, a sleeve disposed within said interior casing and movable through an opening therein into engagement with said seat, and means for operating said sleeve including a closed partition extending across the same to form an interior chamber within said inner casing and means for supplying fluid to said chamber, and piston and cylinder elements operatively associated with said partition to effect operation of said sleeve.

8. A valve mechanism comprising inner and outer casings spaced to form a smooth fluid passageway therebetween, said outer casing having a reduced portion upon which a seat is formed, a sleeve disposed within said interior casing and movable through an opening therein into engagement with said seat, and means for operating said sleeve including a closed partition extending across the same to form an interior chamber within said inner casing, means for supplying fluid to said chamber, and piston and cylinder elements being operatively associated with said partition to effect opening of said sleeve.

9. A valve mechanism comprising inner and outer casings spaced to form a fluid passageway therebetween, a sleeve provided with a downstream open end and having telescopic relation with said inner casing, and adapted to seat upon said outer casing, and an operating piston element the area of which supplements the cross sectional area enclosed by said sleeve.

10. A valve mechanism comprising inner and outer casings spaced to form a fluid passageway therebetween, said inner casing having a fixed nose piece separated from the remainder of the inner casing to form an annular opening, a sleeve movable through said annular opening into engagement with a seat on said outer casing thereby to control fluid flow through said valve, a closed partition carried by said sleeve whereby a chamber is formed between said nose piece and partition, said chamber having exterior communication only through said annular opening, and means for moving said sleeve in opposite directions.

11. A valve mechanism comprising inner and outer casings spaced to form a fluid passageway therebetween, said inner casing having a fixed nose piece separated from the remainder of the inner casing to form an annular opening, a sleeve movable through said annular opening, into engagement with seat formed on said outer casing thereby to control fluid flow through said valve, a closed partition carried by said sleeve whereby a chamber is formed between said nose piece and partition, said chamber having exterior communication only through said annular opening, an operating piston element connected to said sleeve, and means for subjecting simultaneously one side of said piston and said partition to substantially the same fluid pressure.

CHESTER W. LARNER.